June 4, 1968  G. R. KNIGHT, JR., ET AL  3,386,405
ROLL-ON, ROLL-OFF TRANSPORT VESSEL
Filed Sept. 28, 1966  13 Sheets-Sheet 1

INVENTORS
George R. Knight, Jr.
Thomas F. Bridges
Stevens, Davis, Miller & Mosher
ATTORNEYS

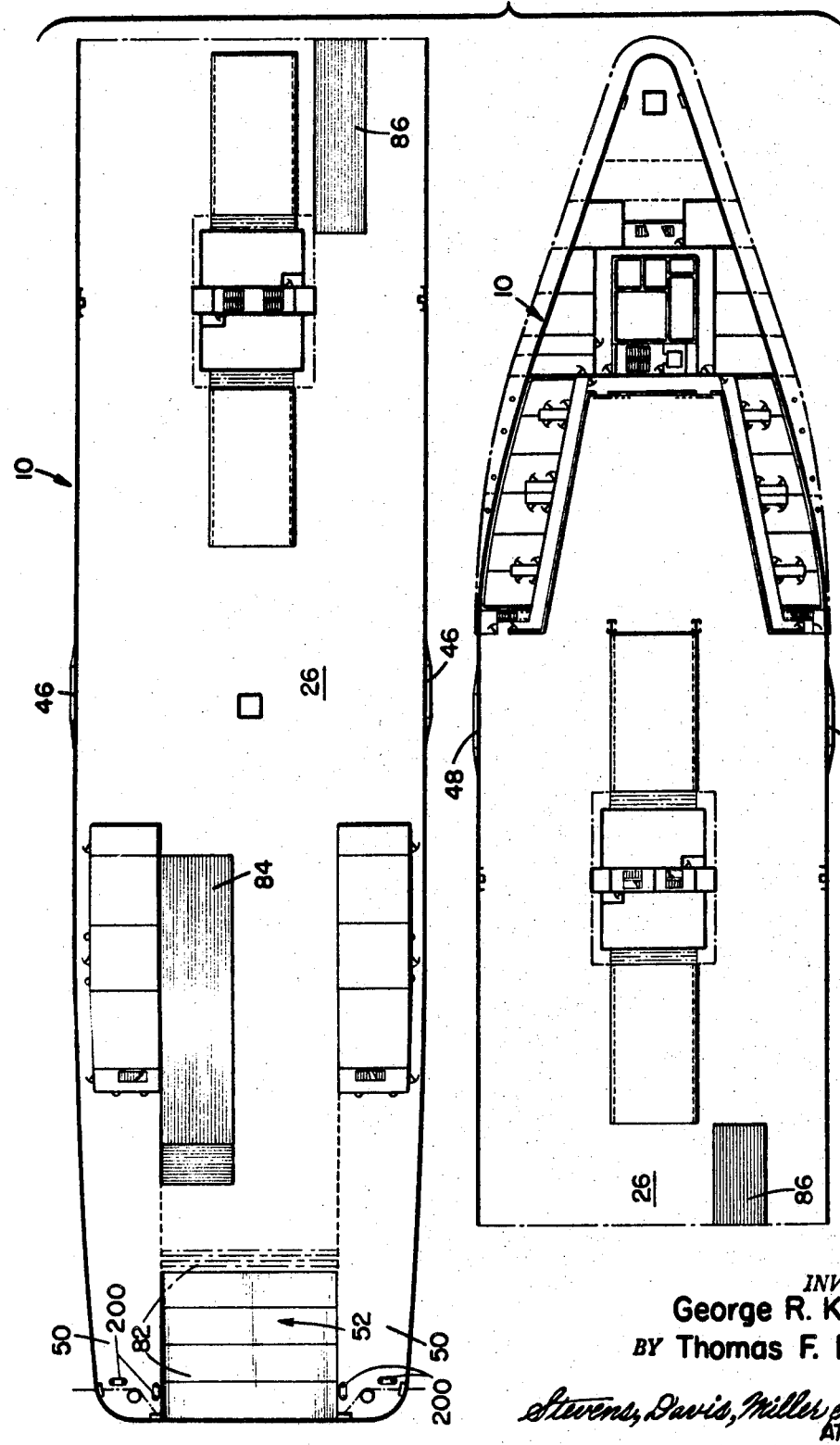

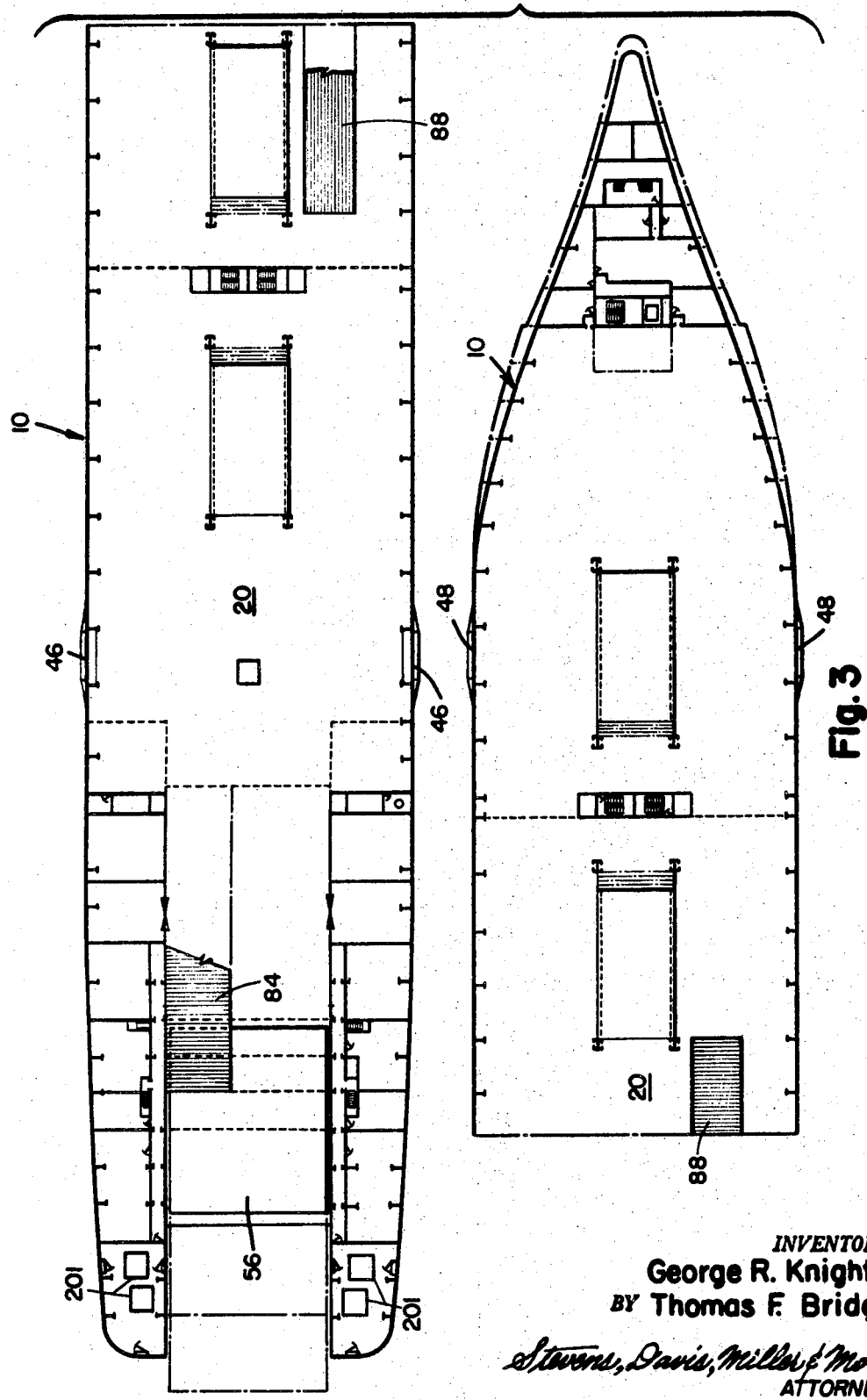

INVENTORS
George R. Knight, Jr.
Thomas F. Bridges
BY
Stevens, Davis, Miller & Mosher
ATTORNEYS June 4, 1968  G. R. KNIGHT, JR., ET AL  3,386,405
ROLL-ON, ROLL-OFF TRANSPORT VESSEL
Filed Sept. 28, 1966  13 Sheets-Sheet 7

INVENTORS
George R. Knight, Jr.
BY Thomas F. Bridges

ATTORNEYS

INVENTORS
George R. Knight, Jr.
Thomas F. Bridges
BY
*Stevens, Davis, Miller & Mosher*
ATTORNEYS June 4, 1968 G. R. KNIGHT, JR., ET AL 3,386,405
ROLL-ON, ROLL-OFF TRANSPORT VESSEL
Filed Sept. 28, 1966 13 Sheets-Sheet 11

INVENTORS
George R. Knight, Jr.
BY Thomas F. Bridges

Stevens, Davis, Miller & Mosher
ATTORNEYS

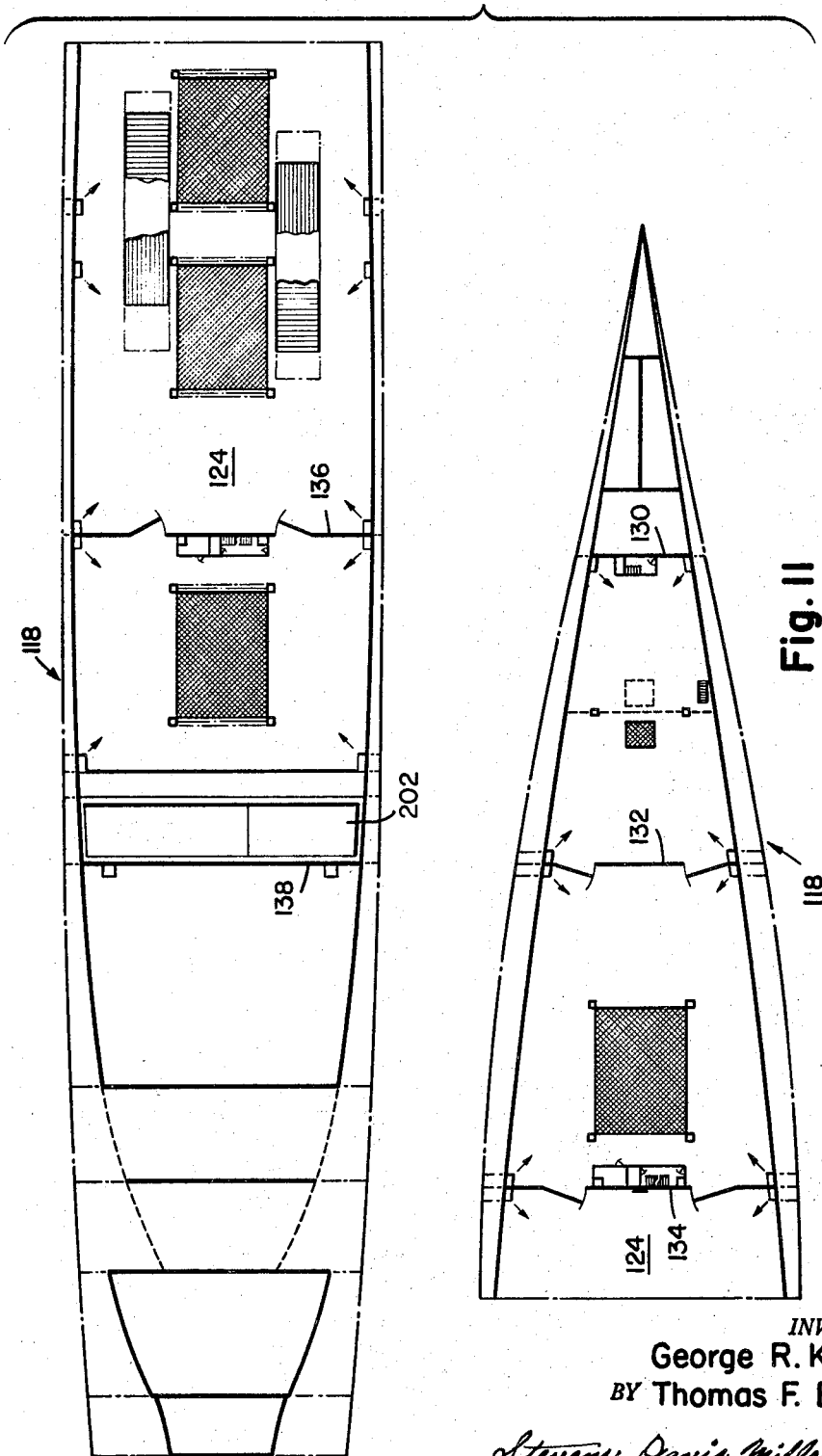

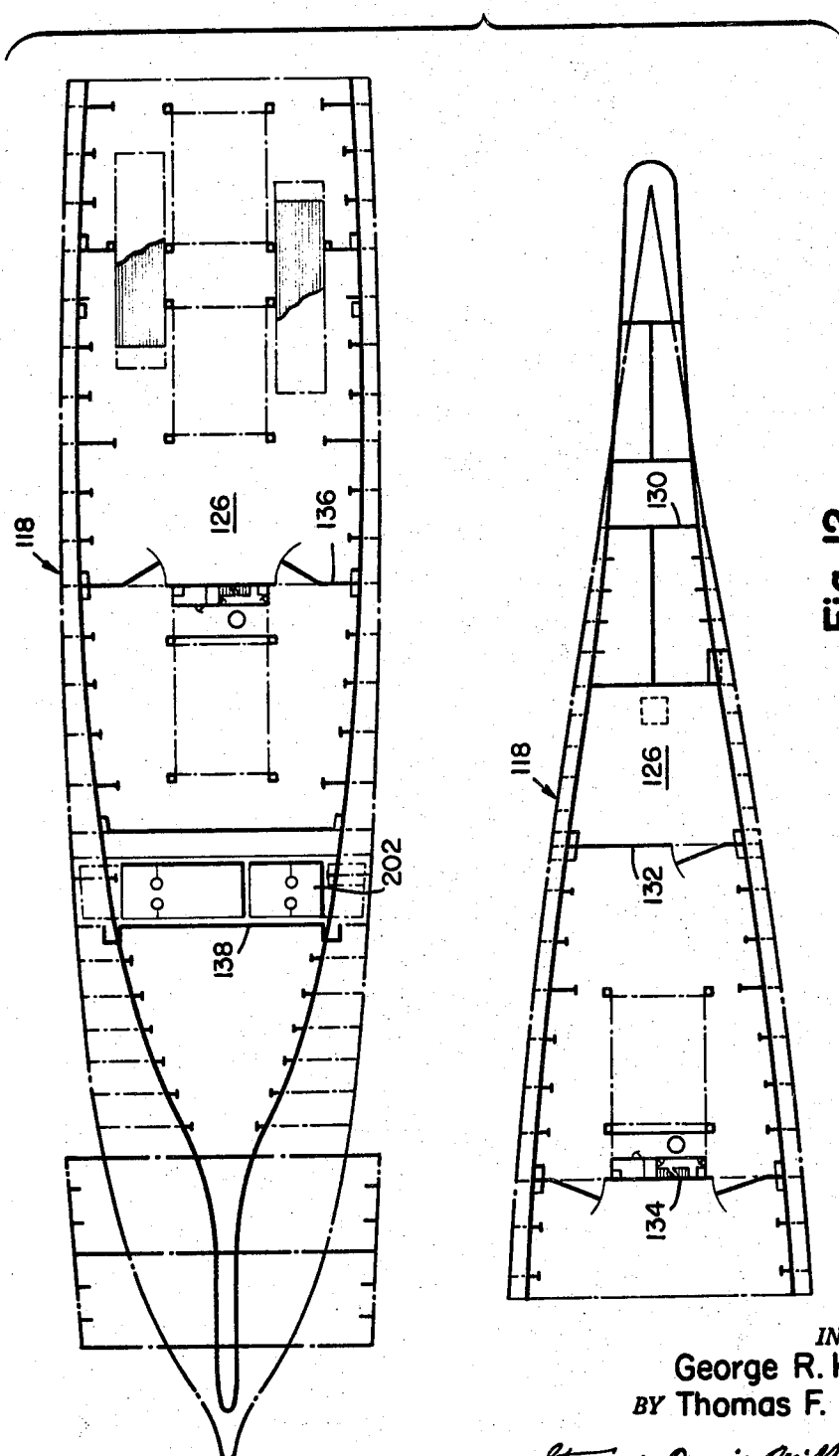

United States Patent Office 3,386,405
Patented June 4, 1968

3,386,405
ROLL-ON, ROLL-OFF TRANSPORT VESSEL
George R. Knight, Jr., and Thomas F. Bridges, Port Washington, N.Y., assignors to John J. McMullen Associates, Inc., New York, N.Y., a corporation of New York
Filed Sept. 28, 1966, Ser. No. 582,718
4 Claims. (Cl. 114—72)

ABSTRACT OF THE DISCLOSURE

A roll-on, roll-off transport ship for quick loading and discharge of self-powered vehicles, including a hull characterized by a plurality of decks and subdivided into a cargo section having at least three holds. A movable ramp system is arranged for the center hold and enables vehicular traffic to different deck levels within the center hold. The holds are separated by liquid-tight transverse bulkheads, each having doors to permit the vehicular movement between holds. A stern ramp system provides vehicular access to the main deck and includes a retractable ramp movable between a stowed position and an operating position.

The present invention relates to roll-on, roll-off ships for transporting vehicles or the like and more particularly to a new design for such a vessel which affords increased ease, speed, and safety for the loading and unloading of the ship as well as an optimum storage capability so that the cargo space volume can be used to its fullest extent.

It is generally known that the design of a roll-on, roll-off vessel must be, in most instances, a compromise solution due to the varied requirements which must be satisfied. Thus, one known design includes a ramp system provided in the rearmost hold section permitting vehicular movement down to any level and then forward to the predetermined stowage position. Another known arrangement, such as that disclosed in U.S. Patent 2,981,217, includes an access ramp to the lower decks of each hold section.

But these conventional designs are plagued with a lack of open, unpillared areas within the cargo space permitting sufficient maneuvering such that there can be a free flow of cargo into, out of, and within the vessel.

It is the purpose of the present invention to provide a design which solves the above problem and affords an optimum design for a vessel of the type described. To this end, the systems (such as conventional cargo handling, power generating) which do not contribute to the primary mission of the ship are optimally designed to function in the normal sense without interfering or detracting from the ship's capability of efficiently transporting vehicular cargo.

Two embodiments of the present invention are disclosed herein by way of example. One embodiment is particularly adapted for transporting commercial cargo such as towed semi-trailer or self-powered vehicles although military vehicles can be carried if desired. The second embodiment serves primarily as a carrier of self-powered military vehicles and can carry its own lighterage equipment for loading and discharging at sea.

In brief, a vessel according to one aspect of the present invention has a number of decks without shear or camber and the deck heights are substantially equal to provide potential stowage of high headroom units anywhere in the ship. Transverse bulkheads extend upward from the ship's bottom to the main deck only, leaving the main deck divided only by pillaring and venting so that free horizontal cargo maneuvering is permitted.

A retractable ramp system is provided in only one of the centrally located hold sections so that traffic can move from the ramp system in the fore and aft directions thus minimizing congestion. Although the decks below the main deck are divided by the transverse bulkheads, horizontal cargo movement from one hold section to another is permitted by large liquid tight doors within the bulkheads. A pillaring system for added deck support is provided near the ship's center line leaving the deck as open as possible. To increase deck area for stowage of low headroom vehicles, one or more of the holds can be fitted with portable stowage racks. A retractable stern ramp cooperates with shore facilities or lighterage equipment and the prime movers are separated and positioned on opposite sides of the stern ramp roadway. Side ports when fitted with ramps afford additional vehicular access for the ship.

It is therefore an object of the present invention to provide a roll-on, roll-off vessel having a stowage area which is as open as possible and has a ramp system and bulkhead arrangement which affords improved vehicular stowage and maneuverability.

It is another object of the invention to provide a roll-on, roll-off vessel with a retractable ramp system in one of the centermost hold sections with large doors in the transverse bulkheads to enable a free flow of fore and aft traffic to the other holds at any deck level.

It is yet another object of the present invention to provide a roll-on, roll-off vessel with transverse bulkheads dividing the cargo sections, said bulkheads extending from the ship's bottom to the main deck, a weather deck supported over the main deck, and a pillaring system providing deck support located near the ship's center line.

Other and further objects of the present invention will become apparent with the following detailed description when taken in view of the appended drawings in which:

FIGS. 2 through 5 are top plan views of the various decks and hold of the ship of FIG. 1.

FIGS. 8 through 12 are top plan views of the various decks of the ship of FIG. 7.

Figure 1:
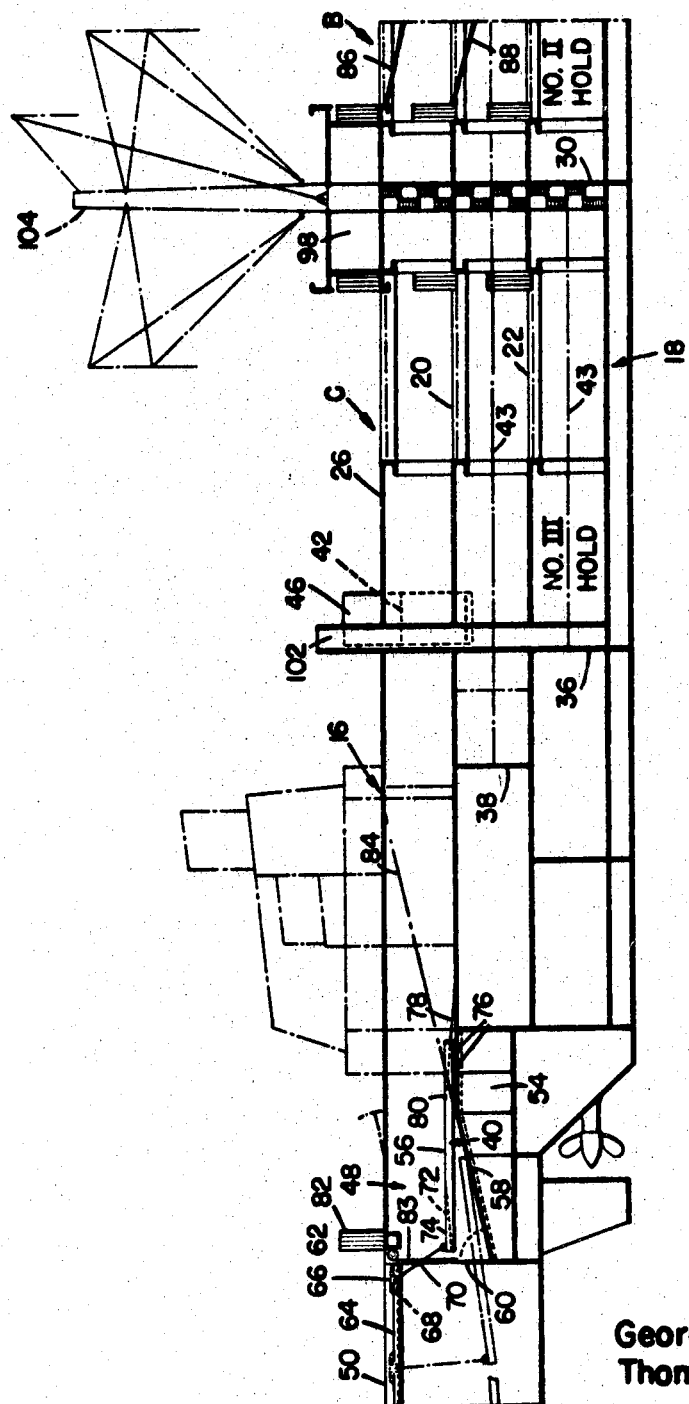
FIG. 1 is a vertical longitudinal section taken generally along the center line of the ship according to one embodiment of the present invention.
Figure 1A:
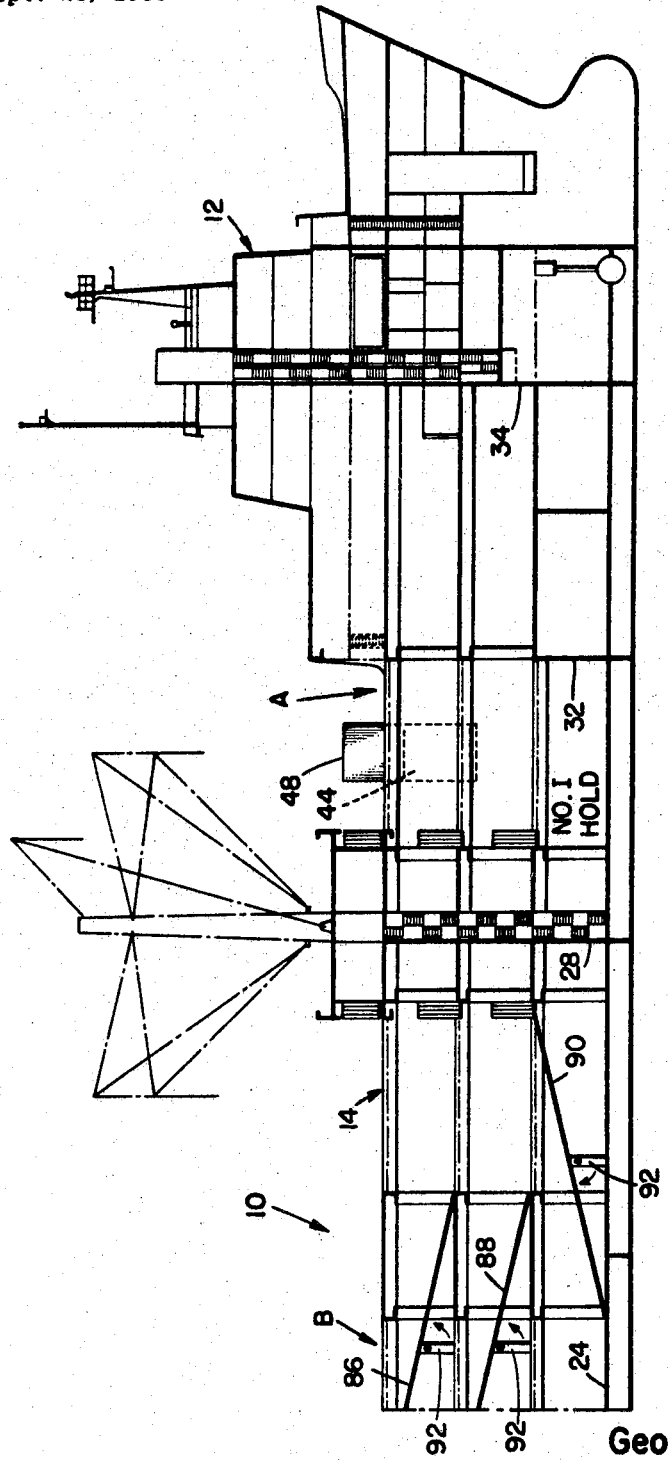
Figure 4:
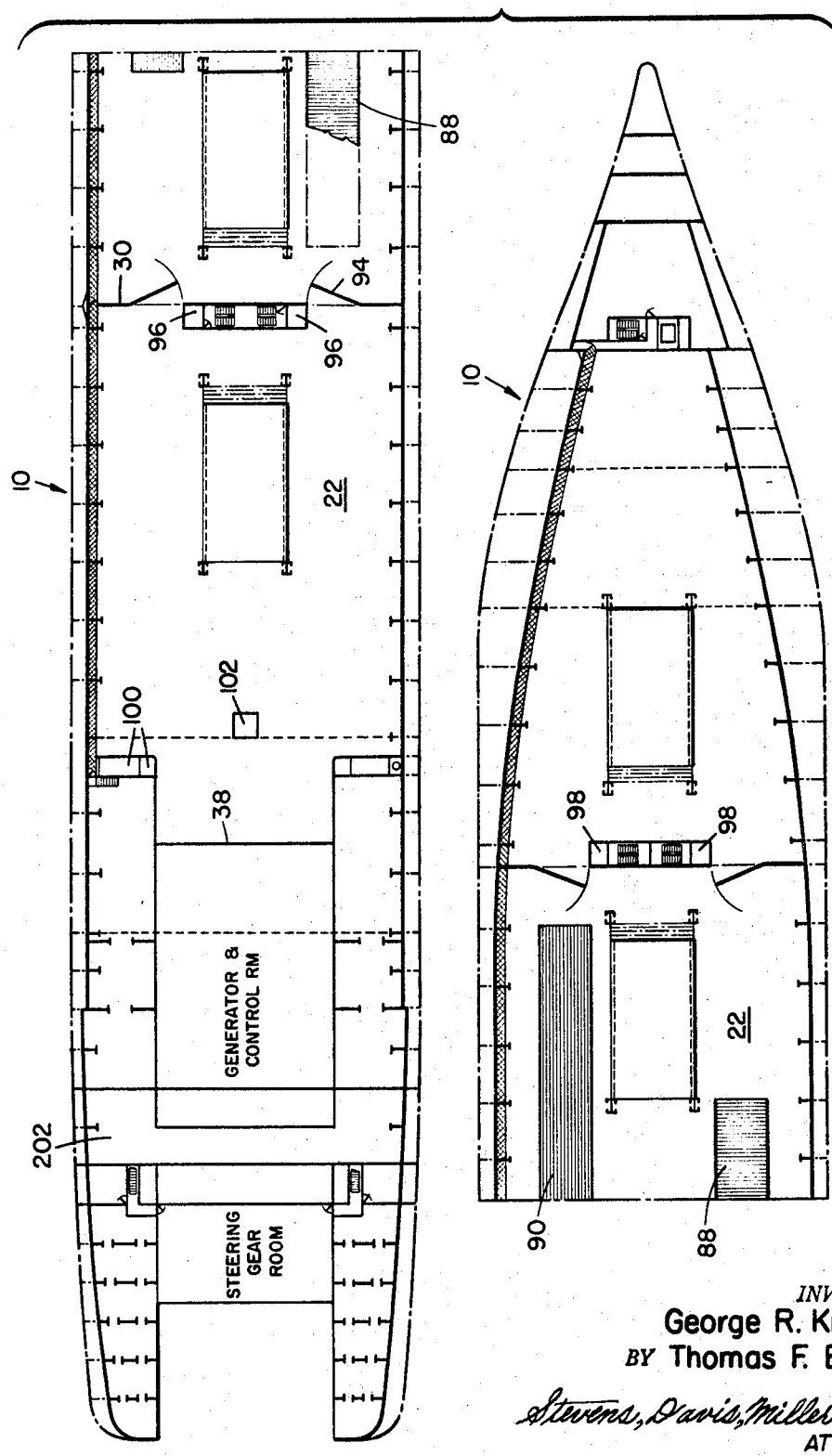
Figure 5:
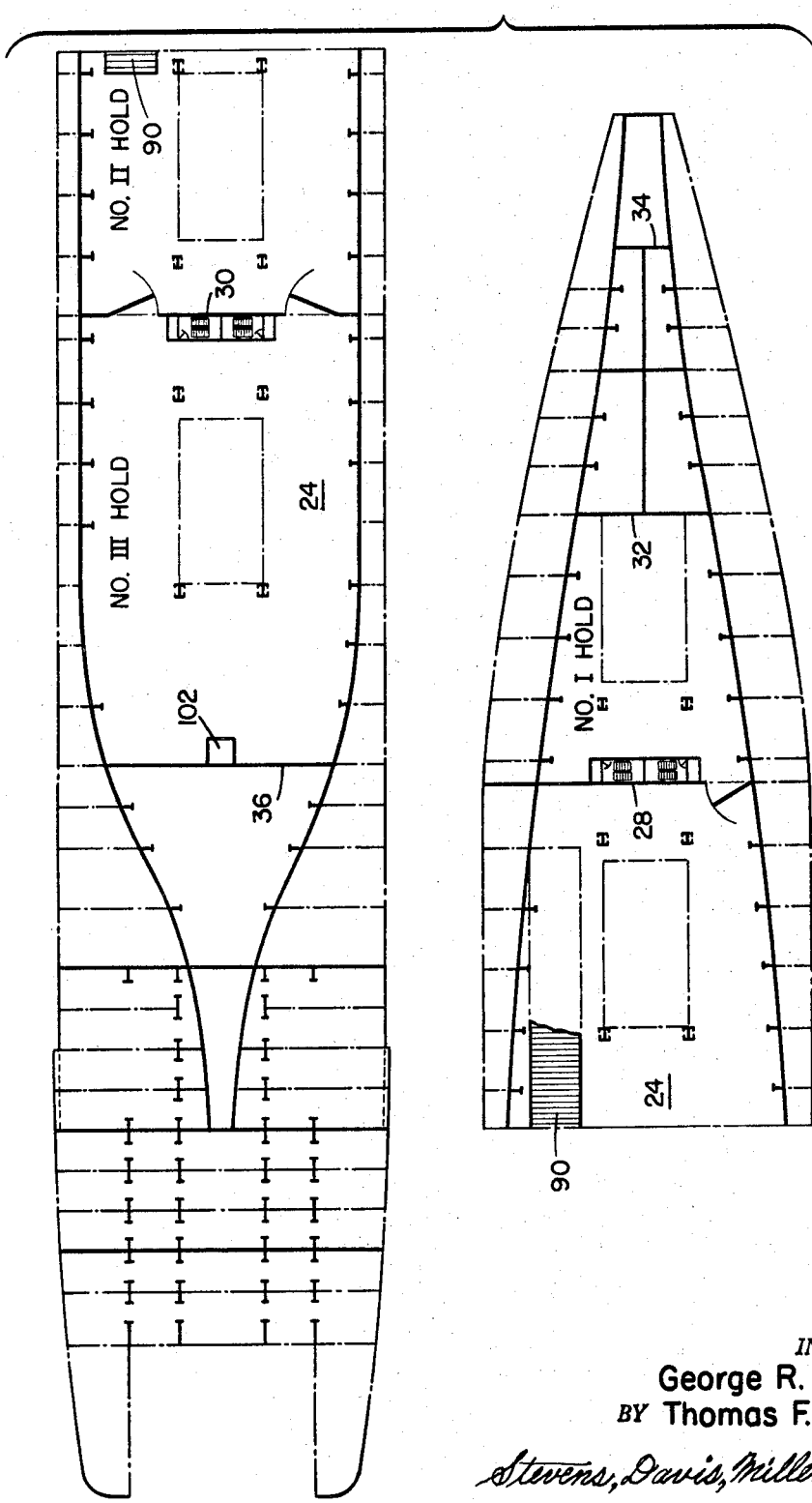
Figure 6:
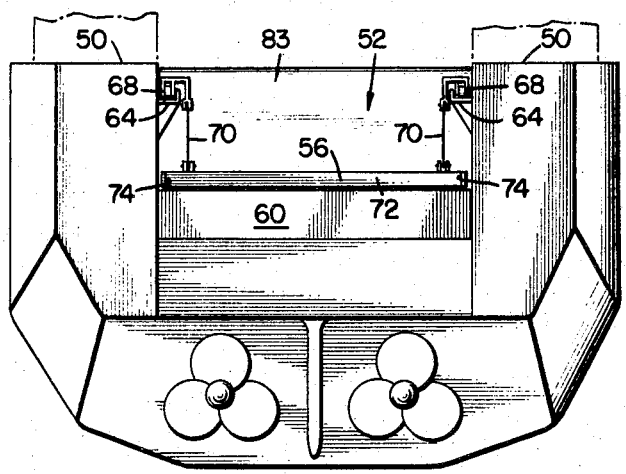
FIG. 6 is a side elevation view showing the aft end of the ship of FIG. 1.
Figure 13:
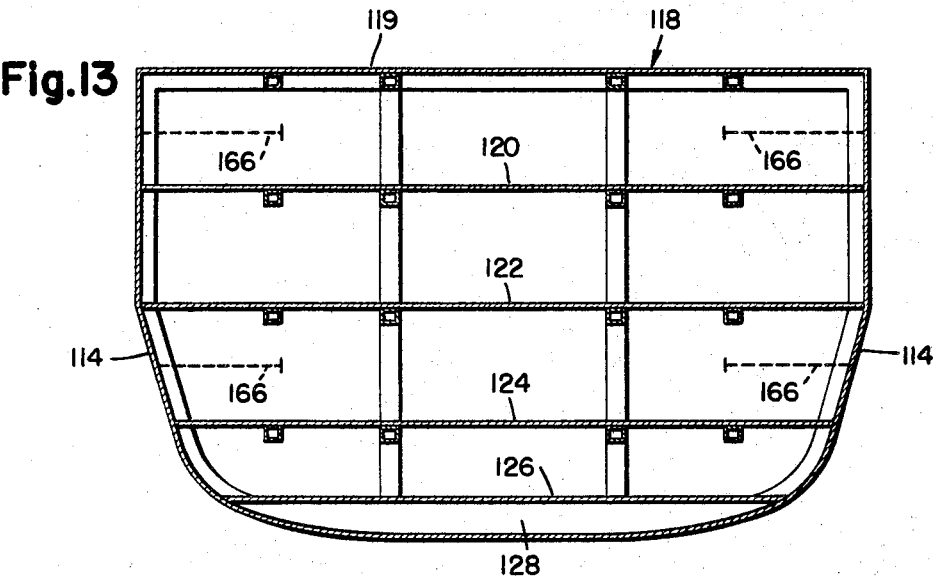
FIG. 13 is a vertical transverse section taken along lines 13—13 of FIG. 7.

With reference to the drawings, the first above-mentioned embodiment of the roll-on, roll-off vessel 10 according to the present invention is of wall sided hull design and includes a forward accommodation section 12, a central cargo section 14 and an aft propulsion and generator section 16. Ship 10 includes a double-bottom 18 running substantially the entire length thereof which serves as a ballast or fuel tank.

Cargo section 14 includes three holds I, II, III each having a main deck 20, a tween deck 22 and a bottom deck 24. Because of high local loadings resulting from cleated treads of military, earth-moving equipment and the like, high tensile steel is preferably utilized for all vehicle deck plating and longitudinal deck framing to minimize the weight of the structure. With the cargo section 14 divided into only three holds, each hold is assured of having sufficient length to permit free traffic flow and maneuverability. A weather deck 26 is provided above the main deck throughout the length of cargo section 14. Clear headroom in all under deck areas is equal throughout at a predetermined height such as for example 14 feet 6 inches to accommodate the tallest vehicle anywhere in the cargo section. In addition, decks 20, 22, 24 and 26 are without shear or camber so as to present simplicity of construction and complete flexibility of module stowage.

By reducing the number of holds, interferences of structure with modular storage and physical obstruction of free vehicle cargo movement are reduced and cargo hold ventilation system effectiveness is enhanced. This three-hold arrangement as disclosed satisfies a one-compartment standard of subdivision at the maximum subdivision draft.

The forward and aft sections of the ship can be framed as desired. However, the central cargo section 14 has a longitudinally framed inner bottom and has all other parts transversely framed. Section 14 is divided into holds by a pair of spaced transverse, water-tight bulkheads 28 and 30 each extending from the ship's bottom to main deck 20. As can be seen in FIG. 1, the tween deck and main deck areas of hold No. I extend forward over a pair of deep tanks and beneath the accommodation section 12. The forward side of the bottom deck area of hold No. I is bounded by transverse bulkhead 32 extending from the ship's bottom to the tween deck, and the forward sides of the tween deck and main deck areas are bounded by transverse bulkhead 34 extending from the ship's bottom upward to at least the weather deck 26.

The aft sides of hold No. III are bounded by a transverse bulkhead 36 at the bottom deck level and bulkhead 38 at the tween deck area. As shown, the water-tight, transverse bulkheads terminate at the main deck except in that part of the ship forward of the cargo section. Thus, the complete main deck level communicates openly with the aft part of the ship which includes an aft ramp system 40 further described below.

Vehicle cargo has access to ship 10 via a stern ramp system 40 and a pair of side ports 42 and 44 arranged at the main deck level on both sides of holds I and III at about their mid-length. Hinged to each side port 42 and 44 is a retractable side ramp 46 and 48 which swings in the transverse plane from a vertical stowed position sealing its associated side port outward to an angle slightly below the horizontal to permit vehicular access to and from the main deck. With each ramp 46 and 48 designed to act as a closure as well as a loading and discharge ramp, there is no further requirement for the provision of separate auxiliary ramps to serve the side port openings. This results in a savings of installation time and storage space and increases the safety to the crew by reducing ramp handling requirements. One example of the side port ramp is 35 feet in length and preferably provides a ramp angle of less than about 12° under reasonable conditions of trim and tide. In order to avoid incorporation of a structural notch by recessing the side shell of the ship, the side port units are located outside the fair line of the ship's hull. This projection however, is smoothly faired off with peripheral trimming plates and no hardware other than the fittings project beyond these plates.

Stern ramp system 40 cooperates with the stern recess 48 which comprises a pair of wing extensions 50 extending aft of the stern to form a stern well 52 which in one example is approximately 35 feet longitudinally and 45 feet in width. This stern recess 48 provides the capability for effectively conducting offshore exchanges with barges, lighters, and landing craft. The sides and ends of extensions 50 are fitted with mooring fittings 200, and two or more constant tension mooring winches 201 are provided to secure lighterage equipment within the recess. Thus, the recessed stern provides protection and mooring capabilities for the smaller craft which would be difficult to obtain otherwise. A passive system 202 of the type described in U.S. Patent No. 3,164,120 is provided in the aft section of the ship and operates to minimize relative or inter-vessel motion when loading or unloading at sea.

At least two prime movers are provided. But unlike conventional arrangements, the prime movers are physically separated, that is, each is positioned on opposite sides of stern recess 48 thus permitting the central location of the stern ramp and the free movement of vehicles therebetween.

That part of the vessel just forward of well 52 includes plating 58 which slopes downward and aft from a forward part which is horizontal at the main deck level. A coaming 60 which is liquid tight when vertical extends transversely across the rear edge of plating 58 which is at the forward boundary of well 52. Coaming 60 has its lower edge hinged to plate 58 for forward rotation thereof to a stowed position when the recess ramp is in use. Operation of coaming 60 is accomplished by a suitable means such as a winch and cable arrangement 62.

The stern ramp system 40 includes a retractable stern ramp 56 which in one example is 44 feet clear width by 50 feet long. The upper surface of ramp 56 has a downward and aft sloping rear surface 72 with a pair of upstanding flanges 74 located at the outboard sides thereof. Thus, the aft end of the ramp is shaped to minimize auxiliary brow requirements. Ramp 56 is similarly shaped at its forward end in order to provide a smoother vehicle path onto and from the ramp surface. A suitable number of rollers 76 are arranged beneath the forward end of ramp 46 and ride on plating 58 permitting frictionless longitudinal movement of ramp 56. An elongated brow 78 has its aft edge hinged to ramp 56 at point 80 and moves forward and aft with ramp 56. Brow 78 provides a smoother path for the vehicle moving between ramp 56 and the main deck 20.

The apparatus for bringing and returning the recess ramp into and from the operating position comprises a pair of horizontal rails 64 mounted longitudinally near the top of the inboard sides of extensions 50. Electric driven carriages 66 with hoisting capabilities are provided with rollers 68 and each rides on one of rails 64. Each carriage 66 carries the upper end of a cable 70 connected to the aft edge at the respective outboard side of ramp 56. Carriages 66 are electrically powered and include a ramp hoist mechanism powered by a synchronous electric motor so that they travel and hoist simultaneously.

For dock side loading and discharging operation stern ramp 56 is extended to project approximately 10 feet beyond the stern of the ship. However, when working to and from lighterage, the stern ramp 56 can be either lowered to the deck of the small craft within the confine of well 52 or be retracted entirely into the larger ship in order to take landing craft bow ramps.

When ramp 56 is stowed, it is lifted to a horizontal position as shown and moved to its extreme forward location. The top of well 52 is closed by a weather-tight holding hatch cover 82 which is normally stored overhead on weather deck 26. Next, the water-tight coaming 60 is returned to its vertical position and a standard aluminum roll door 83 is unrolled to close the space above coaming 60.

As is apparent from FIG. 1 the flow of traffic to and from the ship is via the main deck 20. In order to provide vehicle access to the remaining decks, a central ramp system is provided in centermost hold No. II. One exception is the after main deck to weather deck ramp 84 located just forward of the stern ramp system 48. Ramp 84 has its forward edge hinged to the weather deck 26 and provides, when in the down position, direct access from the stern ramp 56 to the top of weather deck 26. The central internal ramp system comprises ramp 86 hinged to weather deck 26 to provide vehicular access between the main deck 20 level and the weather deck 26 level. When not in use, ramp 86 is raised and secured level with weather deck 26 to provide maximum clear deck area. In addition, deck 86 forms a weather-tight seal with weather deck 26.

Another access ramp 88 hinged to main deck 20 in a position directly below top side access ramp 86 is provided to prevent vehicular access between main deck 20 and tween deck 22. When ramp 88 is not in use it is rotated upward flush with main deck 20 to provide additional main deck area and to form a water-tight seal therewith.

A third ramp 90 hinged to tween deck 22 provides access between bottom deck 24 and tween deck 22. Unlike ramps 86 and 88, the forward end of ramp 90 is hinged and vehicles move downward and aft to reach bottom deck level 24. Ramp 90 can be rotated and secured level with tween deck 22 to provide additional deck area and it is not necessary that ramp 90 form a water-tight or weather-tight seal with tween deck 22.

All ramps are standard pieces of marine equipment and are commercially available. To provide additional headroom for vehicles bridging the lowered ramp and next lower deck, the decks have fold back or removable platings spaced just ahead of the free ramp end when in the raised position.

All ramp movements are actuated by electro-hydraulic motors (not shown) which when the ramps are in up positions are stowed clear of all cargo movements. The ramp structures when in the up position are keyed in adjacent hull structure girders by internally mounted hydraulically actuated support bars (not shown). Each ramp is provided with a pair of hinged pillar supports 92 which swing upward and stow within the ramp when not in use and which swing downward to provide additional support for the ramp at about its mid-length.

With the provision of equal deck heights throughout, the potential stowage of high headroom units is maximized and stability problems resulting from inability to compensate for high topside loads is eliminated. It is recognized, however, that the high uniform storage height results in a significant reduction of total deck area. Additionally, it is seen that, when stowage of low headroom vehicles is considered, the 14′–6″ clear headroom selected causes considerable wasted cubic stowage space on the deck levels where these are stowed. To compensate for these undesirable conditions portable stowage decks 43 will be provided in hold No. III at the hold and lower tween deck levels. Portable cargo decks can be lightweight steel grating construction similar in type to those fitted in bulk carrying merchant vessels to allow the transport of automobiles. When not in use, portable cargo decks are stowed against the overhead clear above headroom limiting girder lines. When required for stowage they are suspended by wire pendants from the deck above.

Raising and lowering will be mechanically actuated through winches and wire rope reeving (not shown). It is intended that the use of portable decks be restricted to lightweight vehicles such as quarter-ton trucks and their associated two-wheel trailers. Access to the portable deck levels will be by means of portable light scantling ramps (not shown).

To permit free flow of horizontal traffic, each transverse bulkhead 30 is provided with a pair of hinged water-tight doors 94 each spaced on opposite sides of the ship's center line. Doors 94 should be large, roughly 14 feet in horizontal dimension and are driven by electro-hydraulically actuated motors (not shown). If desired, as an alternative, sliding doors may be provided mounted on channeled rollers and requiring less room for door operation.

A pair of vertical ventilating trunks 96 positioned on opposite sides of the ship's center line extend from the bottom deck level 24 up to the fan room 98. Each trunk 96 has ventilating intakes communicating with adjacent holds at each deck level for the purpose of removing exhaust and other noxious fumes and delivering a constant flow of fresh air to each deck level for apparent safety reasons. One such pair of ventilating trunks is located adjacent transverse bulkhead 28 and another such pair is located adjacent transverse bulkhead 30. Still another ventilating trunk 102 is positioned along the ship's center line adjacent and just ahead of bulkhead 36. Because of the open nature of the deck levels, which are free from obstruction and because of the free communication between holds via doors 94, good ventilation and air circulation is provided.

To provide additional versatility, lift-on, lift-off cargo facilities are provided and include a pair of conventional 100 ton and 25 ton stationary but swinging booms 104 mounted above weather deck 26 at the ship's center line and at transverse bulkheads 28 and 30. Each hold I and III is provided with a central hatch system extending through all decks and portable flats and hold II is fitted with a pair of hatch systems extending through all decks and portable flats. Each cargo hatch is of the folding flush type with no projections above the surface of the deck when in the closed position. In addition, all cargo hatches on weather deck 26 are of weather type construction and those on the main deck are of the water-tight construction. All other hatch covers may be of the non-tight type, and each hatch cover is completely self-powered in all operations and is operated by means of an electro-hydraulic type motor with individual actuating units completely self-contained within cover panels (not shown). Each hatch cover contains a number of interlocked but removable panels which can be removed by a cargo runner in the event emergency operation is called for.

Thus, although life-on, life-off requirements for vehicular cargo is unlikely, the ship has such capability in the event it becomes necessary for disabled vehicles and the like to be loaded or removed from the ship. In addition, conventional bulk cargo can be loaded and removed without special procedures. However, due to the large wing areas outboard of the hatch openings, handling of general cargo may be carried out with the assistance of fork lift truck equipment.

For added deck support, a plurality of pillars 101 are positioned at the corners of all hatches. In this way, pillars 101 are confined to the central part of the ship out of the way of stowage and traffic areas. Pillars 101 can have any suitable profile with stiffening characteristics.

In the loading operation, ramps 84 and 86 can be raised and stern ramp moved aft to the loading position and side ramps 46 and 48 lowered into operating position. Hinged ramps 88 and 90 are lowered to provide access to the lower decks and all transverse bulkhead doors 94 are swung open. Ventilating fans are energized and air-conditioning units turned on if desired. Self-powered vehicular cargo or semi-trailer type cargo are brought aboard the main deck 20. The openness of the several decks provide good maneuverability and the minimum of obstacles to impede traffic flow. Traffic moves down to tween deck 22 and then onto the bottom deck 24 where it moves fore and aft for stowage in holds I, II and III. It is preferred that heavier modules be located as low in the ship as possible and the design of the present invention accommodates this readily by virtue of the equal deck heights providing maximum headroom for the tallest anticipated module.

In the event a large number of low overhead modules such as quarter ton trucks and the like are to be transported, the portable tween decks in hold III are lowered into position in the manner described. Units are then driven and stowed on bottom deck 24 beneath the portable flat. At the same time, a portable scantling ramp is connected from tween deck 22 down to the top of portable flat. Modules are then driven from deck 22 onto portable flat 93 until the latter is loaded to capacity. At this time, scantling ramps are removed.

This procedure for loading low overhead vehicles on portable flats can be repeated, if desired, for the tween deck level 22.

As traffic moves down ramps 88 and 90, horizontal traffic flow can move simultaneously on decks 22 and 24 in the fore and aft direction so that these deck levels within holds I and III can be filled in the shortest possible time. After the hold II deck level 24 is filled to capacity, ramp 90 is moved to its upper position providing additional deck space for deck 22. As deck level 22 hold II is being filled, ramps 86 and 84 can be lowered to permit additional traffic up to weather deck level 26 either from main deck 20 or the dock facility. After deck level 22 hold II is filled, ramp 88 is rotated to its upper position to provide additional deck space for main deck 20. Main deck 20 and weather deck 26 continue to receive additional modules until they too are filled to capacity at which time ramps 84 and 86 are moved to the upper position to provide a weather-tight seal with deck 26. At this time, access ramp 56 is retracted to its forward, stowed position and coaming 60 rotated to the vertical. The aluminum cover 82 is next unfolded forward to provide a weather-tight seal over well 52.

Arriving at destination, the procedure for unloading is the reverse of that described. Loading and unloading can be accomplished at sea by use of the rear access ramp 56 in the manner described above.

Referring now to FIGS. 7 to 13, there is illustrated another embodiment of the present invention which serves primarily as a self-powered military vehicle carrier. The full ship's height of approximately 68½ feet from the ship's bottom to upper deck is divided into four levels by a main deck 120, a second deck 122 and a third deck 124. Tank top 126 serves as a hold bottom and defines the upper boundary of the double-bottom compartment 128. The upper three deck levels running throughout the cargo section of the ship are of uniform height and in this example each is approximately 17 feet.

Transverse liquid-tight bulkheads 130, 132, 134, 136 and 138 divide the cargo section into four holds. The First Second and Fourth hold sections being about one-half the length of the Third hold section, the latter of which includes the central ramp system further described below. Bulkheads 132, 134 and 136 are provided with a pair of hinged water-tight swinging doors permitting fore and aft communication between the hold sections at each deck level with the exception of bulkhead 132 at the hold bottom which is provided with a single swinging door because of the width of the bulkhead at this part of the ship.

Unlike the embodiment described above, vehicular access to and from the ship is by way of the second deck 122 and the main deck 120 terminates aft near the forward part of hold No. IV. Further, in order to increase the stability of the ship, the hull form of the vessel 114 is of the flared-side design from the double bottom upward to a height slightly above the expected water line with vertical sides being provided from this level upward to the upper deck 119. This hull form affords increased ship stability and added stowage volume.

Figure 7:
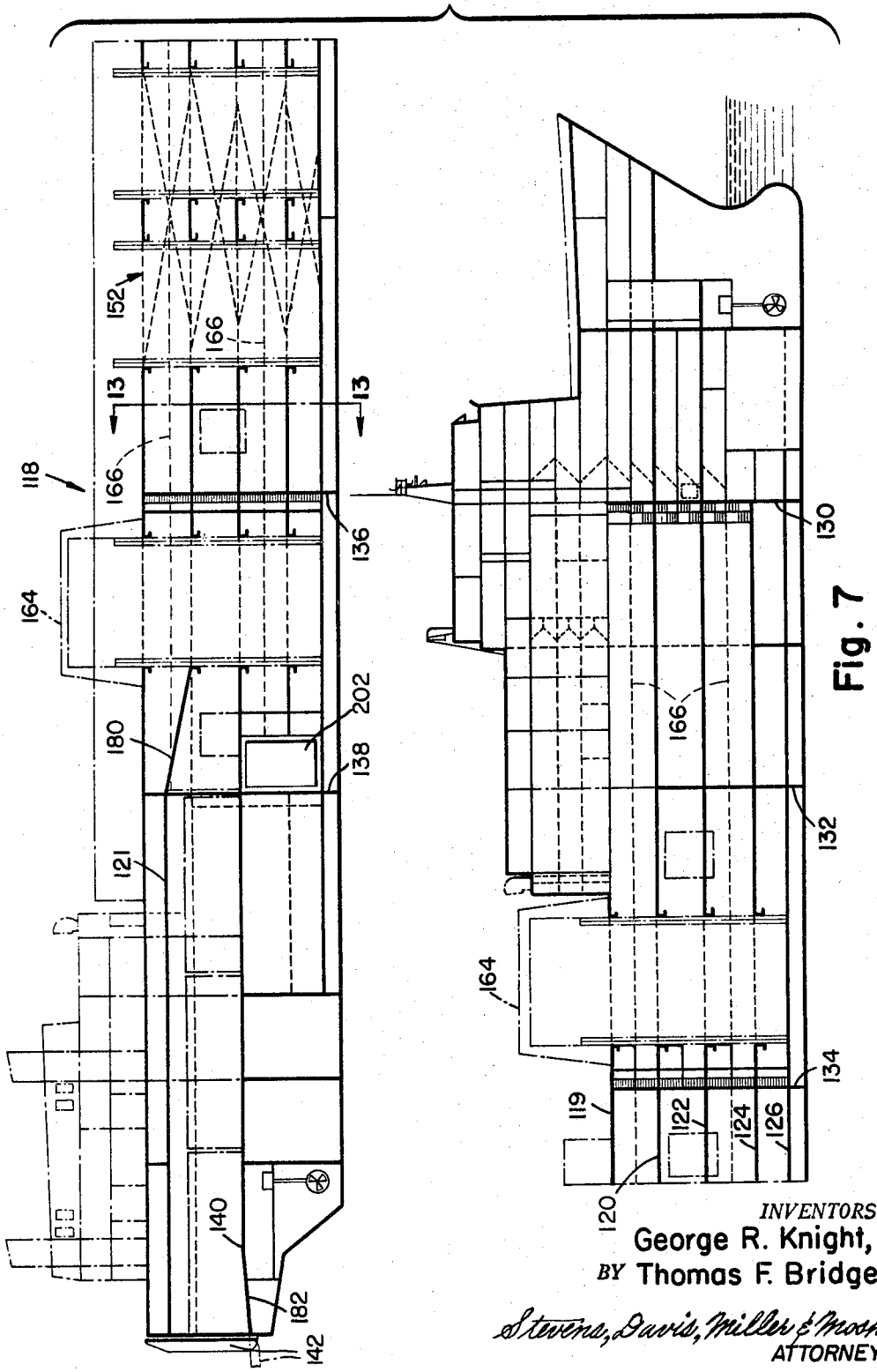
FIG. 7 is a vertical longitudinal section showing the inboard profile of another embodiment of the present invention.

The aft part of main deck 120 and hold IV slopes at 180 upward to a height of about 25 feet above second deck 122 and the remainder of main deck 120 extends horizontally aft to the rear of the ship. In addition, the aft part 140 of second deck 122 slopes downward at 182 toward the rear access ramp 142 which is raised and lowered by conventional winches and cables. When in the raised position, ramp 142 provides a weather-tight seal for the rear of the vessel. As shown in FIG. 7, ramp 142 can be rotated downward to a position about 12° below the horizontal. Ramp 142 is approximately 35 feet in the fore and aft when lowered and has a transverse dimension of about 60 feet.

Side ports and ramps 144–150 provide the access for the second deck 122 near the forward and aft ends of holds II and IV, respectively, and near the forward and aft ends of hold III.

A central ramp system 152 comprises a pair of hinged ramps for each deck level, one ramp serving as a down ramp and the other as an up ramp. The ramps are centered longitudinally within hold III and spaced equally on opposite sides of the center line of the ship and equally from the outboard sides of the hull. To avoid clearance problems, the ramps hinged to upper deck 119 are the longest dimension and the ramps at each successive deck from top to bottom have a progressively shorter length. In addition, the longitudinal hinge location for each ramp is staggered or offset longitudinally from the hinged location at adjacent deck levels. As each deck level is filled to vehicular capacity, the ramps hinged to the next upper deck are rotated to their horizontal position to provide additional deck space for the next upper level. The ramps hinged to the main deck provide a watertight seal therewith when in the raised position and the ramps hinged to upper deck 119 provide a weather-tight seal when secured in their raised position.

Each hold of vessel 118 is provided with a venting and air circulation system comprising vertical delivery ducts 154 feeding air into each hold at various locations at each deck level. Exhaust vents 156 also communicate with each hold at each deck level to provide air circulation.

Figure 8:
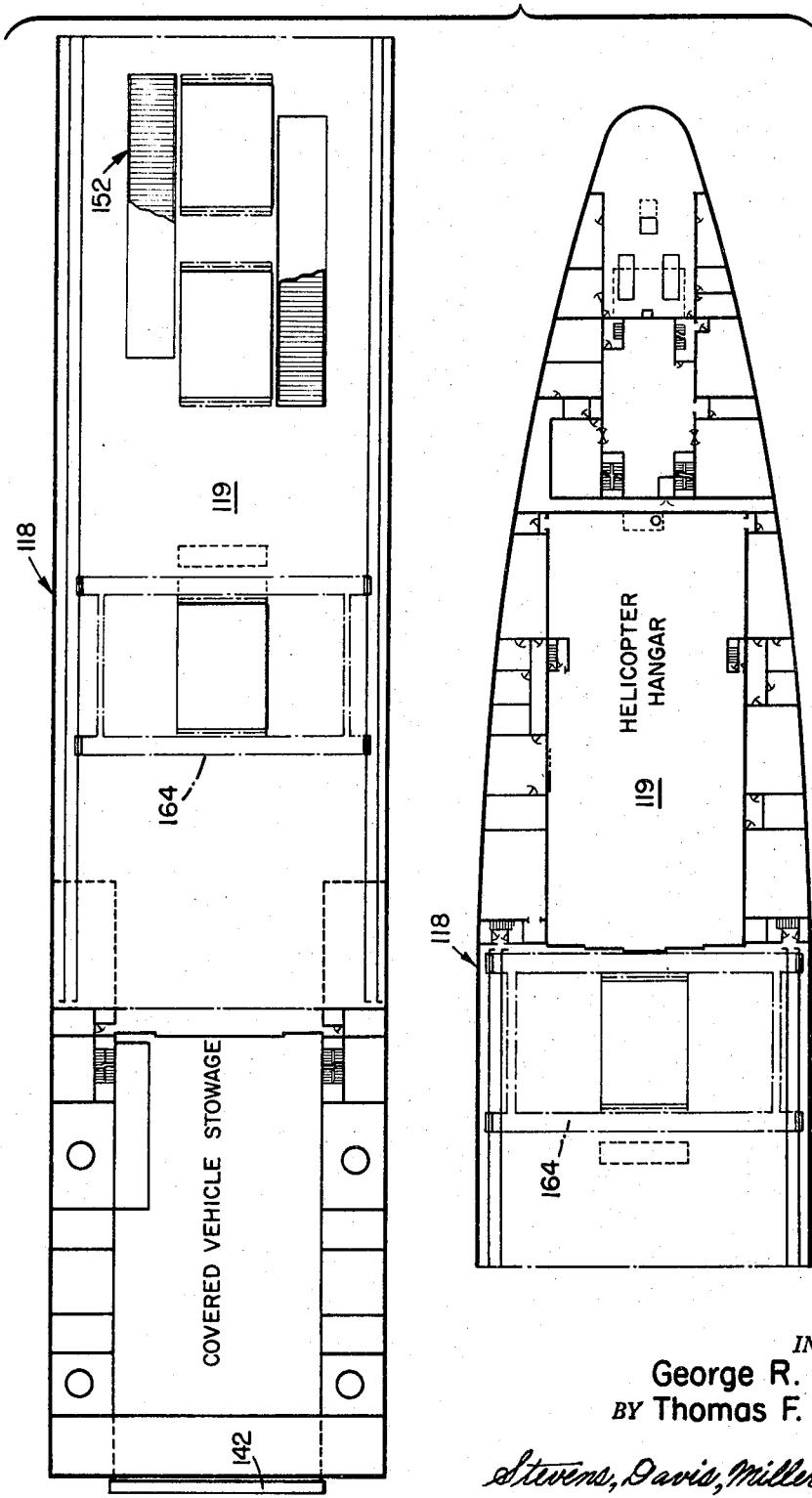
Figure 9:
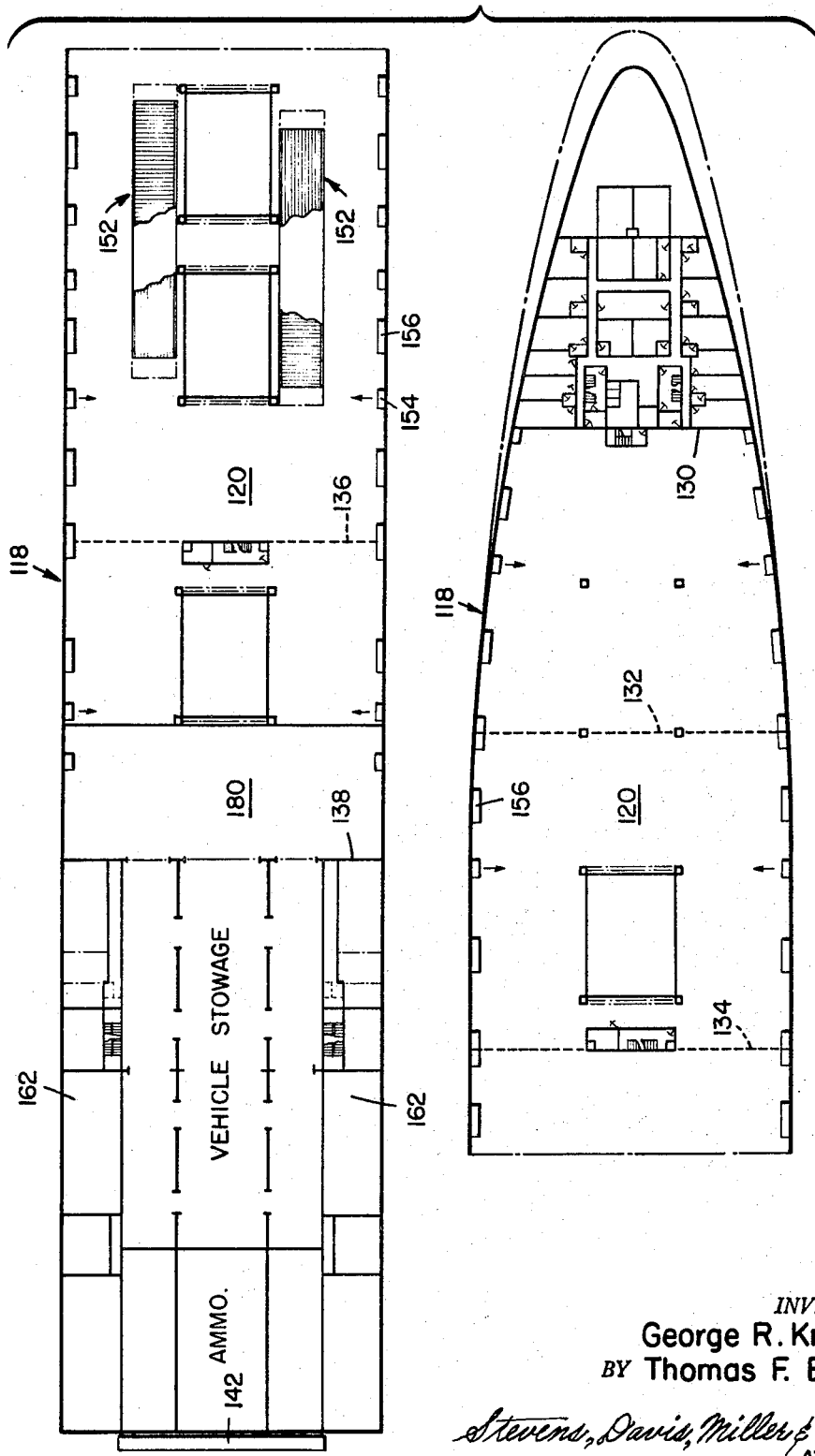
Figure 10:
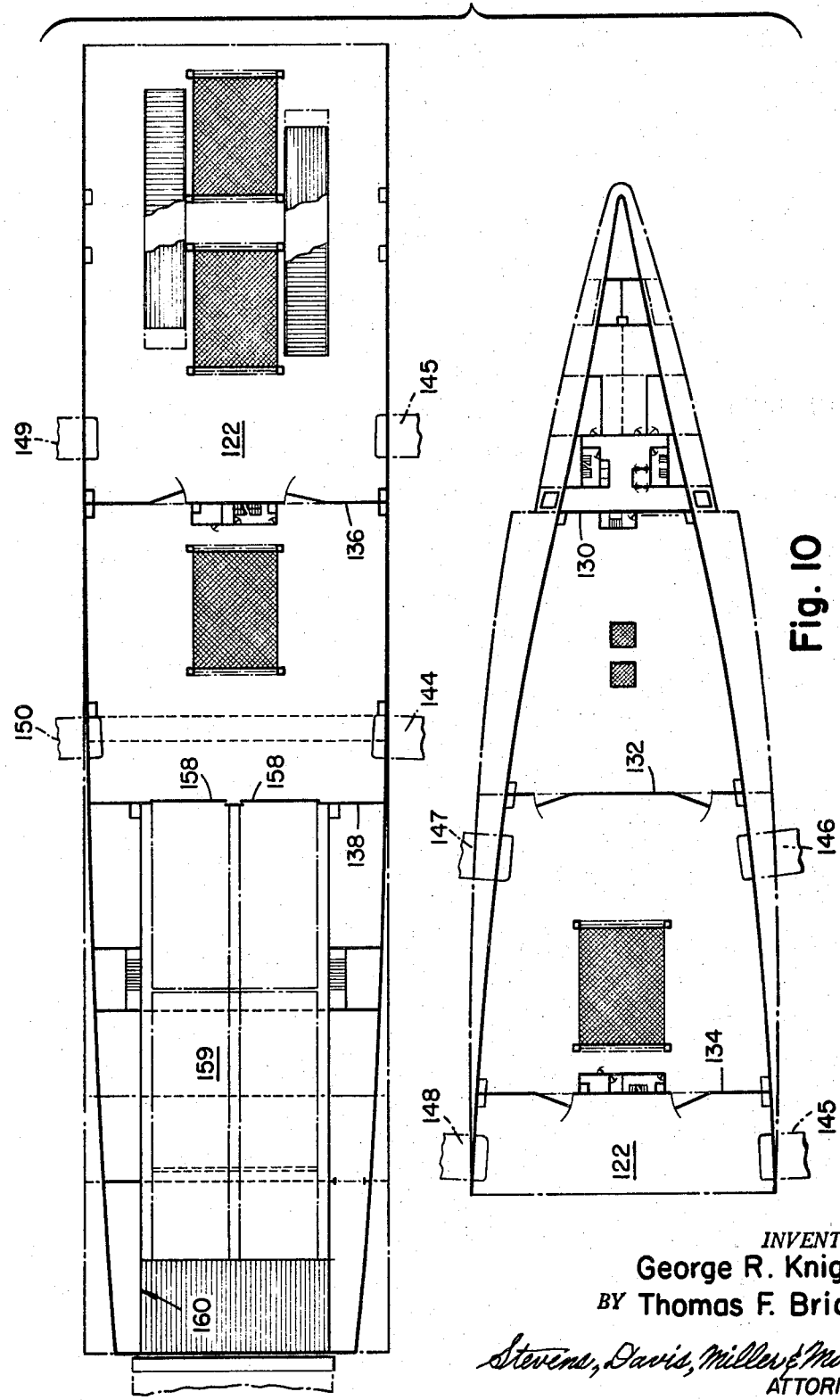

As better seen in FIGS. 8–10, the stern access ramp 142 leads into a wide channel or alley-way which opens through a pair of wide sliding horizontal water-tight doors 158 into the rear of hold IV on deck level 122. The aft section of the ship comprises a pair of elongated, upstanding side wing sections 160 flanking the access alley 159 and extending from deck level 122 up to the upper deck 122. The aft part 121 of main deck 120 divides this wing section into an upper and lower level and each wing section 160 is further divided into rooms by transverse bulkheads generally as shown. One such room 162 in each wing section 160 serves to house the prime movers which include a gas turbine driving an electric generator, both being standard pieces of marine equipment. Although the generators are mechanically independent, they are electrically tied together by conventional means (not shown). In this way, the prime movers are spaced on opposite sides of the hull permitting vehicular movement therebetween.

As in the first-described embodiment, a hatch system is provided in each hold except hold number I due to its dimensions. A pair of track mounted travelling gantry cranes each having about 35 ton lifting capability is supported on upper deck 119 so that joint operation of the cranes 164 provides the capability of lifting 70 tons. Each crane 164 is longitudinally mavable to a position above the hatch system generally as shown in FIG. 7 where it can deliver and remove conventional or vehicular cargo to the various deck levels of the holds.

In order to increase the stowage space for low overhead vehicles, portable decks having adjustable heights can be built into deck levels 120 and 124. Unlike the suspended portable decks mentioned above, these portable decks 166 are built up from the hull sides of the ship inward to any desired location, support therefor being provided by scaffolding or any other conventional type of support.

The operation of this embodiment is substantially the same as that described above. Vessel 118 affords good vehicle storage and movement versatility since the three upper decks are of uniform height. In addition, high headroom vehicles such as cranes and the like may be stored within the aft part of second deck 122 since the headroom therefor aft of hold number IV is approximately 25 feet. Alternately, LARC 60's or other lighterage can be stored in this space—such vessels being used for quick deployment at sea.

It should be understood that various modifications can be made to the herein disclosed examples of the present invention without departing from the spirit and scope thereof.

What is claimed is:

1. A roll-on, roll-off transport ship for quick loading and discharging self-powered and semitrailer vehicles and the like comprising a hull including a plurality of decks including a main deck, and a cargo section with at least three holds, a movable ramp system permitting vehicular movement to different deck levels within a centermost hold, said holds being separated by liquid-tight transverse bulkheads extending to the main deck, each such bulkhead being provided with a closable door at each deck level below the main deck to permit horizontal vehicular movement into and out of the holds fore and aft of said centermost hold, a pair of side ports provided on each side of the hull providing vehicular access to the main deck, one side port being forward of and the other side port being aft of the ramp system, a stern ramp system providing vehicular access to the main deck via the ship's stern, the stern ramp system including a rearward and downward sloping floor extending from the main deck, the ship's stern having a pair of wing extensions positioned beyond the aft end of the floor to define a well behind the floor which is open at the back, a rectractable ramp having a forward part for riding longitudinally on the floor, and means movable on the wing extensions for carrying longitudinally the aft part of the ramp so as to move the aft part of the ramp from a stowed position above the floor to an operating position behind the floor.

2. A roll-on, roll-off transport ship for quick loading and discharging self-powered and semitrailer vehicles and the like comprising a hull including a plurality of decks including a main deck, and a cargo section with at least three holds, a movable ramp system permitting vehicular movement to different deck levels within a centermost hold, said holds being separated by liquid-tight transverse bulkheads, each such bulkhead being provided with a closable door at each deck level below the main deck to permit horizontal vehicular movement into and out of the holds fore and aft of the centermost hold, a sloping deck at the stern of the ship permitting vehicular access to one of the decks via the ship's stern, the hull including wing compartments on opposite sides of the sloping deck and extending upward and forward thereof, and a pair of prime movers each located in a wing compartment on opposite sides of the ship so that vehicles can move therebetween, said prime movers being electrically tied together for synchronizing purposes.

3. A vessel as set forth in claim 1 further comprising a retractable liquid tight coaming provided at the rear edge of the floor adapted to be rotated upright when the ramp is stowed, a roll door extending across the upper forward edge of the well and adapted to unroll downward to the coaming to close the forward side of the well, and a foldable hatch cover positioned to cover the top of the well.

4. A vessel as set forth in claim 1 wherein each wing extension is provided with mooring equipment to secure lighterage equipment within the well and said ship further including a passive tank stabilizer for keeping ship roll to a minimum.

References Cited

UNITED STATES PATENTS

| | | | |
|---|---|---|---|
| 3,138,131 | 6/1964 | Szychlinski | 114—72 |
| 3,164,120 | 1/1965 | Field | 114—125 |
| 3,318,276 | 5/1967 | Nemec | 114—72 X |

FOREIGN PATENTS

| | | | |
|---|---|---|---|
| 1,000,114 | 8/1965 | Great Britain. | |

MILTON BUCHLER, *Primary Examiner.*

TRYGVE M. BLIX, *Examiner.*